(12) United States Patent
Shah et al.

(10) Patent No.: US 10,977,443 B2
(45) Date of Patent: Apr. 13, 2021

(54) CLASS BALANCING FOR INTENT AUTHORING USING SEARCH

(71) Applicant: International Business Machines Corporation, Armonk, NY (US)

(72) Inventors: Abhishek Shah, Jersey City, NJ (US); Tin Kam Ho, Millburn, NJ (US)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 16/180,902

(22) Filed: Nov. 5, 2018

(65) Prior Publication Data

US 2020/0142960 A1    May 7, 2020

(51) Int. Cl.
| G06N 99/00 | (2019.01) |
| G06F 40/30 | (2020.01) |
| G06N 20/00 | (2019.01) |

(52) U.S. Cl.
CPC ............ G06F 40/30 (2020.01); G06N 20/00 (2019.01)

(58) Field of Classification Search
CPC ...... G06F 40/30; G06F 16/3344; G06N 20/00
USPC .......................................................... 704/9
See application file for complete search history.

(56) References Cited

U.S. PATENT DOCUMENTS

| 8,898,140 | B2 | 11/2014 | Cooper et al. | |
| 2004/0148170 | A1 | 7/2004 | Acero et al. | |
| 2006/0037080 | A1* | 2/2006 | Maloof ................ | G06F 21/562 726/24 |
| 2009/0327260 | A1 | 12/2009 | Li et al. | |
| 2015/0006442 | A1* | 1/2015 | Ogilvie ................ | G06Q 50/01 706/12 |
| 2016/0055132 | A1* | 2/2016 | Garrison .............. | G06F 16/958 706/12 |
| 2016/0188574 | A1 | 6/2016 | Homma et al. | |
| 2017/0039484 | A1* | 2/2017 | Niemczyk ............ | G06N 7/005 |
| 2017/0124211 | A1* | 5/2017 | Suter ...................... | G06N 5/003 |
| 2018/0060326 | A1 | 3/2018 | Kuo et al. | |
| 2018/0060755 | A1* | 3/2018 | Green .................... | H04L 67/22 |
| 2018/0232421 | A1 | 8/2018 | Dialani et al. | |
| 2018/0285349 | A1* | 10/2018 | Mineno ................ | G06F 40/268 |
| 2018/0357221 | A1* | 12/2018 | Galitsky ............... | G06F 40/205 |
| 2019/0035387 | A1* | 1/2019 | Zitouni .................. | G06N 20/00 |

(Continued)

OTHER PUBLICATIONS

IBM, "List of IBM Patents or Patent Applications Treated As Related," for U.S. Appl. No. 16/180,902, titled "Class Balancing for Intent Authoring Using Search," as filed Nov. 5, 2018.

*Primary Examiner* — Edwin S Leland, III
(74) *Attorney, Agent, or Firm* — Patterson + Sheridan, LLP

(57) ABSTRACT

Embodiments provide for class balancing for intent authoring using search via: receiving a positive example of an utterance associated with an intent, building an in-intent pool of utterances from a conversation log using the positive example in a first search query of the conversation log; adding the in-intent pool of utterances as a positive class to a training dataset; applying Boolean operators to negate the positive example to form a complement example; building an out-intent pool of utterances from the conversation log using the complement example in a first search query of the conversation log; and adding the out-intent pool of utterances as a complement class to the training dataset. The training dataset may be balanced to include a predefined ratio of positive and complement examples. The training dataset may be used to train or retrain an intent classifier.

20 Claims, 5 Drawing Sheets

(56) References Cited

U.S. PATENT DOCUMENTS

| | | | |
|---|---|---|---|
| 2019/0138595 A1* | 5/2019 | Galitsky | G06N 3/006 |
| 2019/0213502 A1* | 7/2019 | Navratil | G06N 20/00 |
| 2019/0213503 A1* | 7/2019 | Navratil | G06F 16/583 |
| 2019/0266282 A1* | 8/2019 | Mitchell | G06F 16/436 |
| 2020/0027157 A1* | 1/2020 | Xu | G06N 5/048 |
| 2020/0142960 A1* | 5/2020 | Shah | G06F 9/46 |

* cited by examiner

CLASS BALANCING FOR INTENT AUTHORING USING SEARCH

BACKGROUND

The present invention relates to training conversational models for use in Natural Language Processing (NLP), and more specifically, to balancing classifier training data sets. NLP models are trained to recognize the intent of a spoken or written communication that uses unstructured human-language (i.e., an utterance) based on the content, order, and context of words recognized in the communication. A developer indicates various intents that a user is expected to have when interacting with the NLP model, and supplies various decision and dialog trees that may be presented to a user who has indicated a particular intent. As unstructured human language communications may be ambiguous (e.g., due to homologues, colloquialisms, implied meanings, sentence ordering), NLP models include a classifier that is trained to recognize the intent of an utterance from the available intents specified by the developer. The classifier may determine the intent by various techniques so that a context-appropriate response is generate to communications from a user. The dataset used to train the classifier in an NLP model, however, determines the accuracy of a determined intent as much, or more than the technique chosen to recognize the intent; a classifier developed using a poorly constructed dataset for training will likely produce inaccurate results when determining intents in utterances.

SUMMARY

According to one embodiment of the present invention, a method for class balancing for intent authoring using search is provided, the method comprising: receiving a positive example of an utterance associated with an intent, building an in-intent pool of utterances from a conversation log using the positive example in a first search query of the conversation log; adding the in-intent pool of utterances as a positive class to a training dataset; applying Boolean operators to negate the positive example to form a complement example; building an out-intent pool of utterances from the conversation log using the complement example in a first search query of the conversation log; and adding the out-intent pool of utterances as a complement class to the training dataset.

According to one embodiment of the present invention, a computer-readable storage medium including instructions that when executed by a processor enable the processor to perform an operation for class balancing for intent authoring using search is provided, the operation comprising: receiving a positive example of an utterance associated with an intent; building an in-intent pool of utterances from a conversation log using the positive example in a first search query of the conversation log; adding the in-intent pool of utterances as a positive class to a training dataset; applying Boolean operators to negate the positive example to form a complement example; building an out-intent pool of utterances from the conversation log using the complement example in a first search query of the conversation log; and adding the out-intent pool of utterances as a complement class to the training dataset.

According to one embodiment of the present invention a system for intent authoring using search is provided, the system, comprising: a processor; and a memory storage device including instructions that when executed by the processor, enable the processor to: receive a positive example of an utterance associated with an intent; build an in-intent pool of utterances from a conversation log using the positive example in a first search query of the conversation log; add the in-intent pool of utterances as a positive class to a training dataset; apply Boolean operators to negate the positive example to form a complement example; build an out-intent pool of utterances from the conversation log using the complement example in a first search query of the conversation log; and add the out-intent pool of utterances as a complement class to the training dataset.

DETAILED DESCRIPTION

Figure 1:
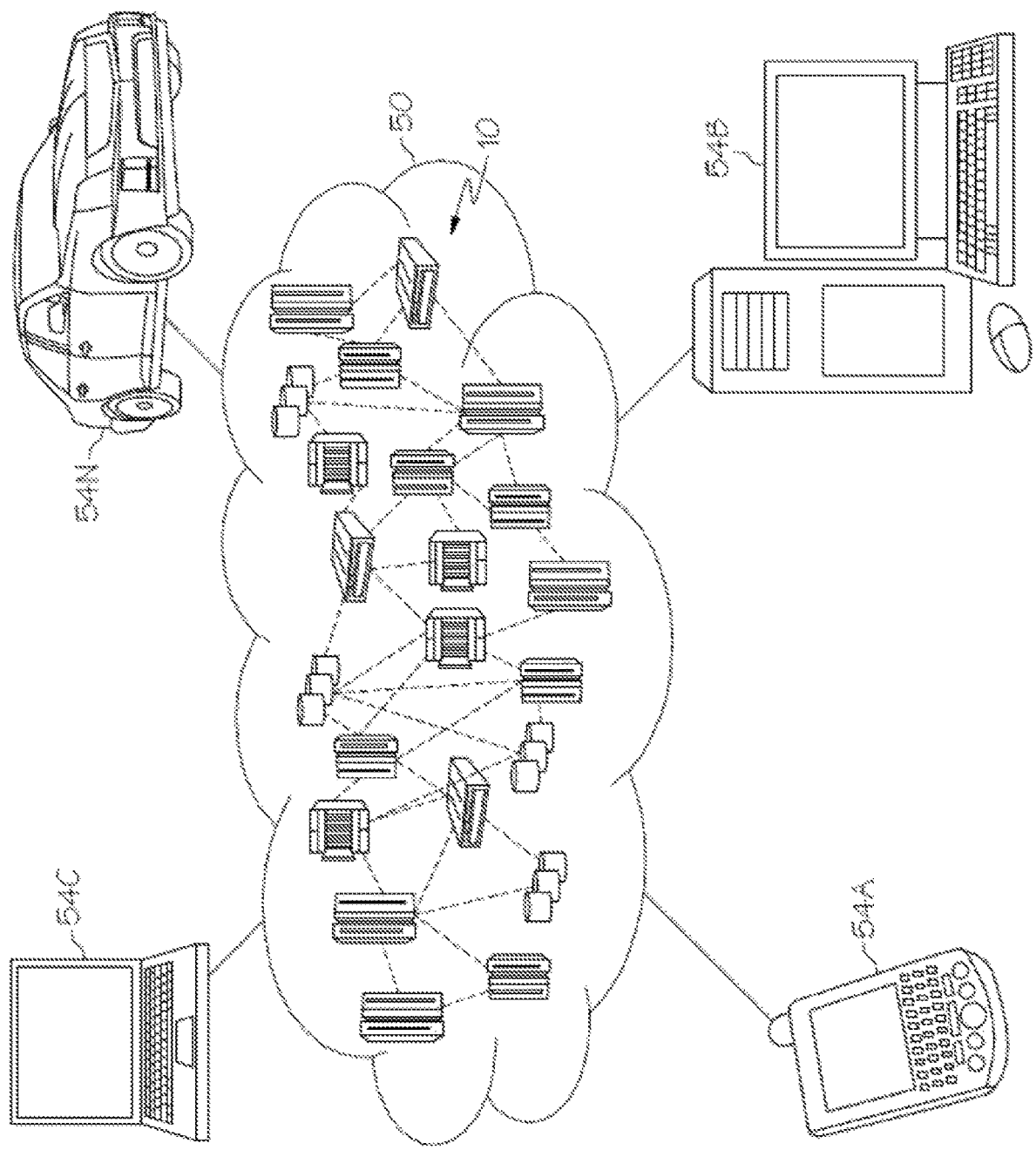
FIG. 1 depicts a cloud computing environment according to an embodiment of the present disclosure.

When training a classifier for use in a Natural Language Processing (NLP) model, such as a chatbot, to identify various intents that a user may express, a developer should provide a large and varied training dataset to the classifier. A large and varied training set, with examples that positively indicate a given intent and that do not indicate a given intent allows the classifier to identify features with an utterance that are positively associated with the given intent, are immaterial to association with the given intent, and that are negatively associated with the given intent.

As will be appreciated, a lexical feature that has one association (positive/negative/neutral) with one intent may have a different association with another intent. For example, the word 'weather' may be positively associated with an intent to provide a forecast, and negatively associated with an intent to provide cooking instructions, whereas the word 'temperature' may be positively associated with both intents. As such, a classifier presented with an utterance that includes both 'temperature' and 'weather' may be more likely to identify the intent of the user to receive a forecast than if an utterance using only 'temperature'. In another example, the word 'recent' may be positively associated with an intent to identify items having occurred within a predefined time window and negatively associated with an intent to identify items outside of a predefined time window.

Given the semantic flexibility available in a natural language to formulate a query in different ways, providing a sufficiently large training dataset to cover the myriad different formations that different users may apply to indicate the same intent is challenging. Particularly challenging can be providing negative examples, where an utterance should be understood to not indicate a particular intent. Without providing sufficient negative examples (also referred to as complements or complementary examples) to the positive examples, a classifier may be miss-trained; creating nonsensical associations between utterances and intents. For example, the utterance of "How do I account for daylight savings time?" may cause a classifier to identify an intent of "Adjust Account Settings" if the classifier has not been provided this utterance (or similar utterances) as a negative example during training, despite a human user being readily able to understand that the query has nothing to do with account settings.

The present disclosure provides improvements for computing devices in generating and populating training datasets that provide more accurate and broader complement examples. Using existing chat logs, the training dataset is built to include a pool of negative examples and positive examples. The negative examples are found from the chat logs using the positive examples as a basis for a Boolean search. The present disclosure balances the two pools and ensures proper classification of examples used in the various pools to further improve the reliability of the training dataset, and the resulting accuracy of the models trained therefrom.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
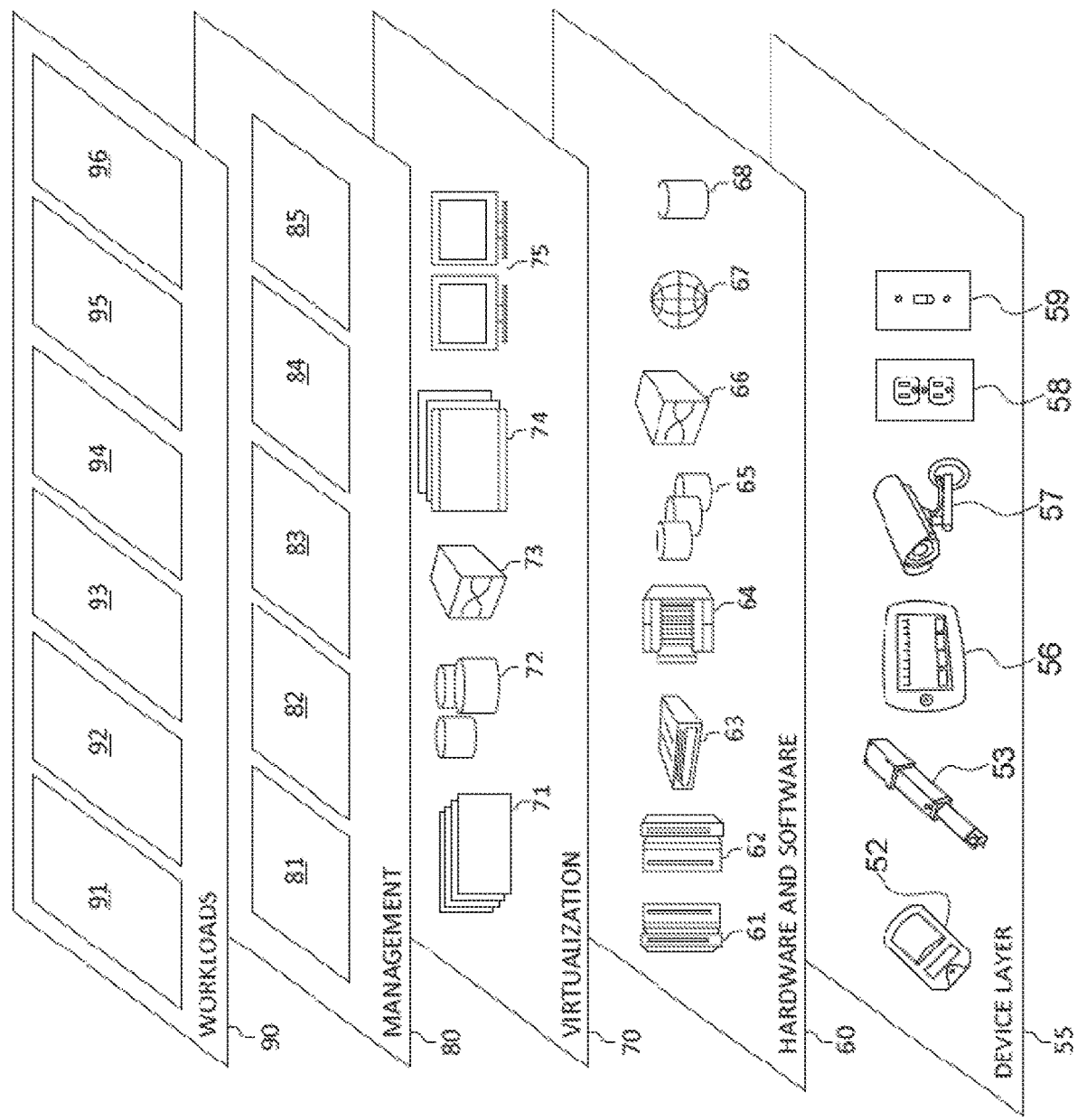
FIG. 2 depicts abstraction model layers according to an embodiment of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and class balancing training datasets for intent authoring using search 96.

Figure 3:
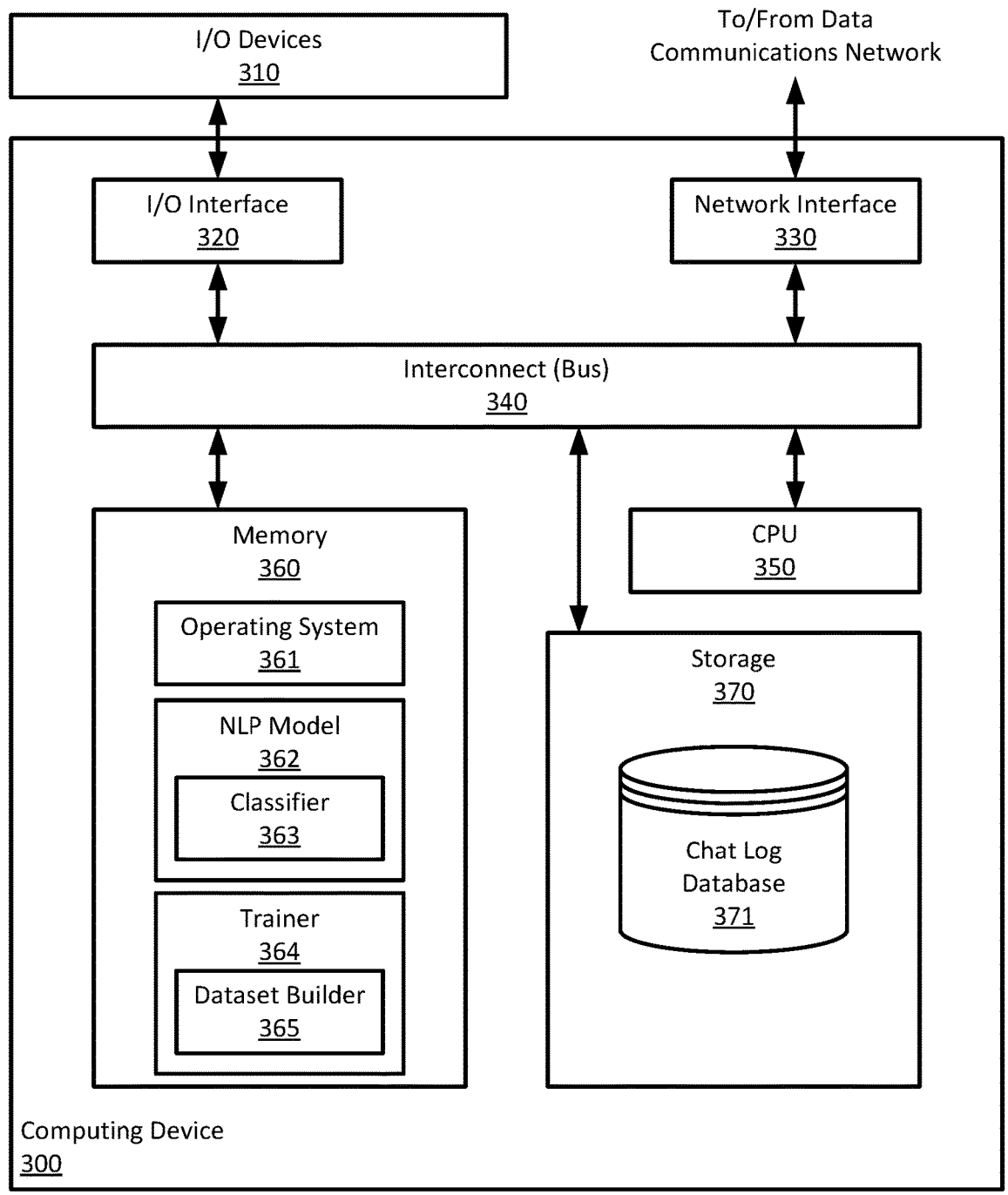
FIG. 3 illustrates a computing device for class balancing for intent authoring via search, according to embodiments of the present disclosure.
Figure 3:
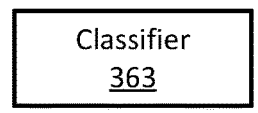

FIG. 3 illustrates a computing system 300, such as a node 54, which may be a personal computer, a laptop, a tablet, a smartphone, etc. As shown, the computing system 300 includes, without limitation, a central processing unit (CPU) 350, a network interface 330, an interconnect 340, a memory 360, and storage 370. The computing system 300 may also include an I/O device interface 320 connecting I/O devices 310 (e.g., keyboard, display and mouse devices) to the computing system 300.

The CPU 350 retrieves and executes programming instructions stored in the memory 360. Similarly, the CPU 350 stores and retrieves application data residing in the memory 360. The interconnect 340 facilitates transmission, such as of programming instructions and application data, between the CPU 350, I/O device interface 320, storage 370, network interface 340, and memory 360. CPU 350 is included to be representative of a single CPU, multiple CPUs, a single CPU having multiple processing cores, and the like. And the memory 360 is generally included to be representative of a random access memory. The storage 370 may be a disk drive storage device. Although shown as a single unit, the storage 370 may be a combination of fixed and/or removable storage devices, such as magnetic disk drives, flash drives, removable memory cards or optical storage, network attached storage (NAS), or a storage area-network (SAN). The storage 370 may include both local storage devices and remote storage devices accessible via the network interface 330. One or more chat log databases 371 are maintained in the storage 370, which include various historical natural language utterances and responses (i.e., conversations) received from users. The conversations may include human-to-human interactions as well as human-to-chatbot interactions.

Further, computing system 300 is included to be representative of a physical computing system as well as virtual machine instances hosted on a set of underlying physical computing systems. Further still, although shown as a single computing system, one of ordinary skill in the art will recognized that the components of the computing system 300 shown in FIG. 3 may be distributed across multiple computing systems connected by a data communications network.

As shown, the memory 360 includes an operating system 361 (e.g., Microsoft's WINDOWS® Operating System), at least one NLP Model 362, including a classifier 363, and a trainer 364, including a dataset builder 365. The trainer 364 develops one or more NLP models 362, such as may be used by chatbots, that are trained with an associated classifier 363 to identify various intents from user utterances when deployed. A developer for the NLP model 362 may specify a set of intents that utterances from a user are to be mapped to by the classifier 363, and may provide various examples for use in training the classifier 363 and the NLP model 362.

The dataset builder 365 may include a search service or an Application Program Interface (API) to an existing search service to access the chat log database 371. Using one or more utterances provided by a developer, the dataset builder 365 queries the chat log database 371 for other examples based on the provided examples that may be used in a training dataset. The utterances stored in the chat log database 371 may be useful as positive examples for a particular intent, or as negative/complement examples for a particular intent, and the dataset builder 365 identifies which utterances stored in the chat log database 371 to include or exclude from various pools in the training dataset. Some utterances found in the chat log database 371 may be useful as both positive examples and as negative/complement examples, albeit for different intents.

Figure 4:
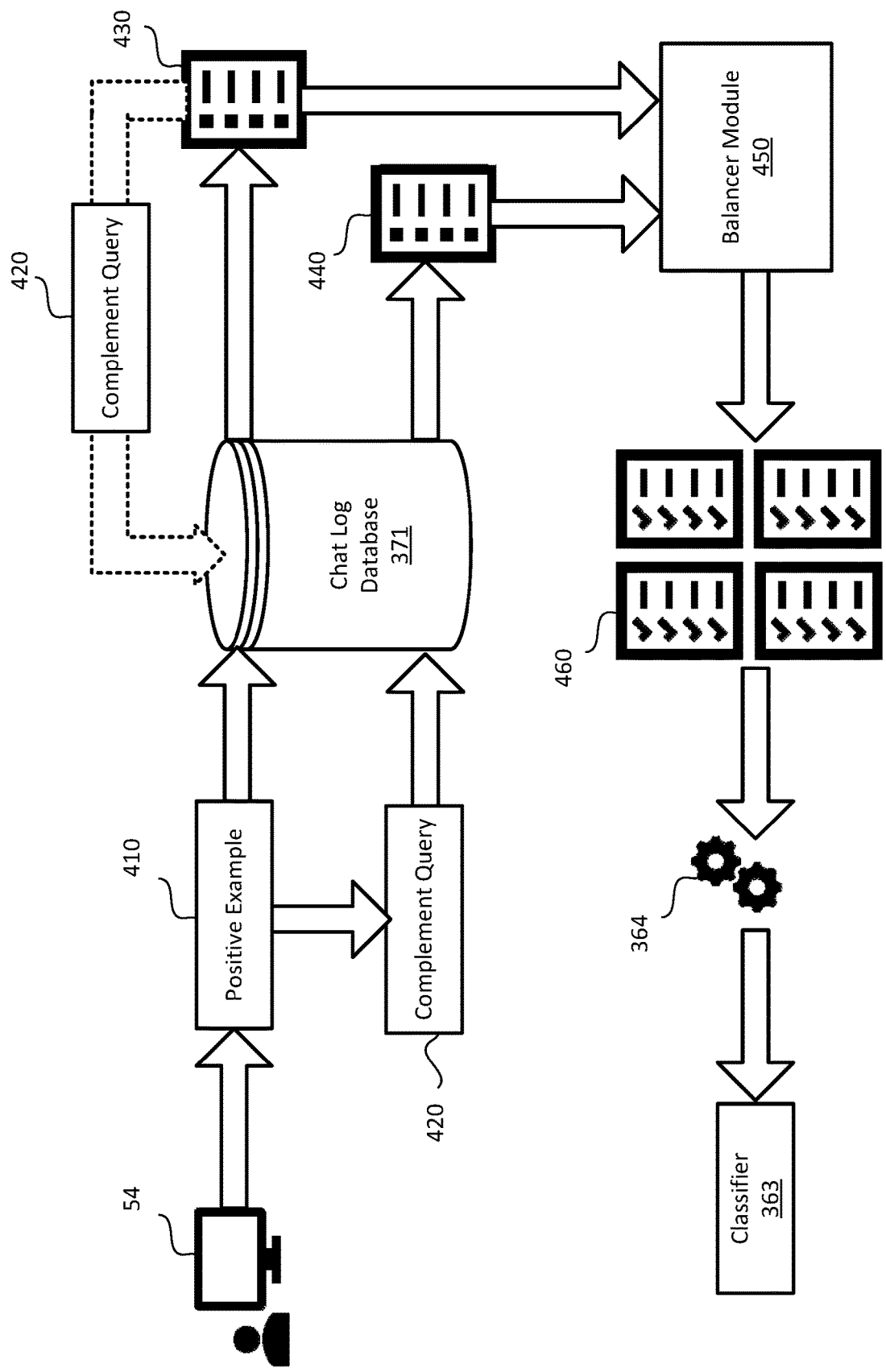
FIG. 4 illustrates a flow for building a dataset for intent authoring, according to embodiments of the present disclosure
Figure 5:
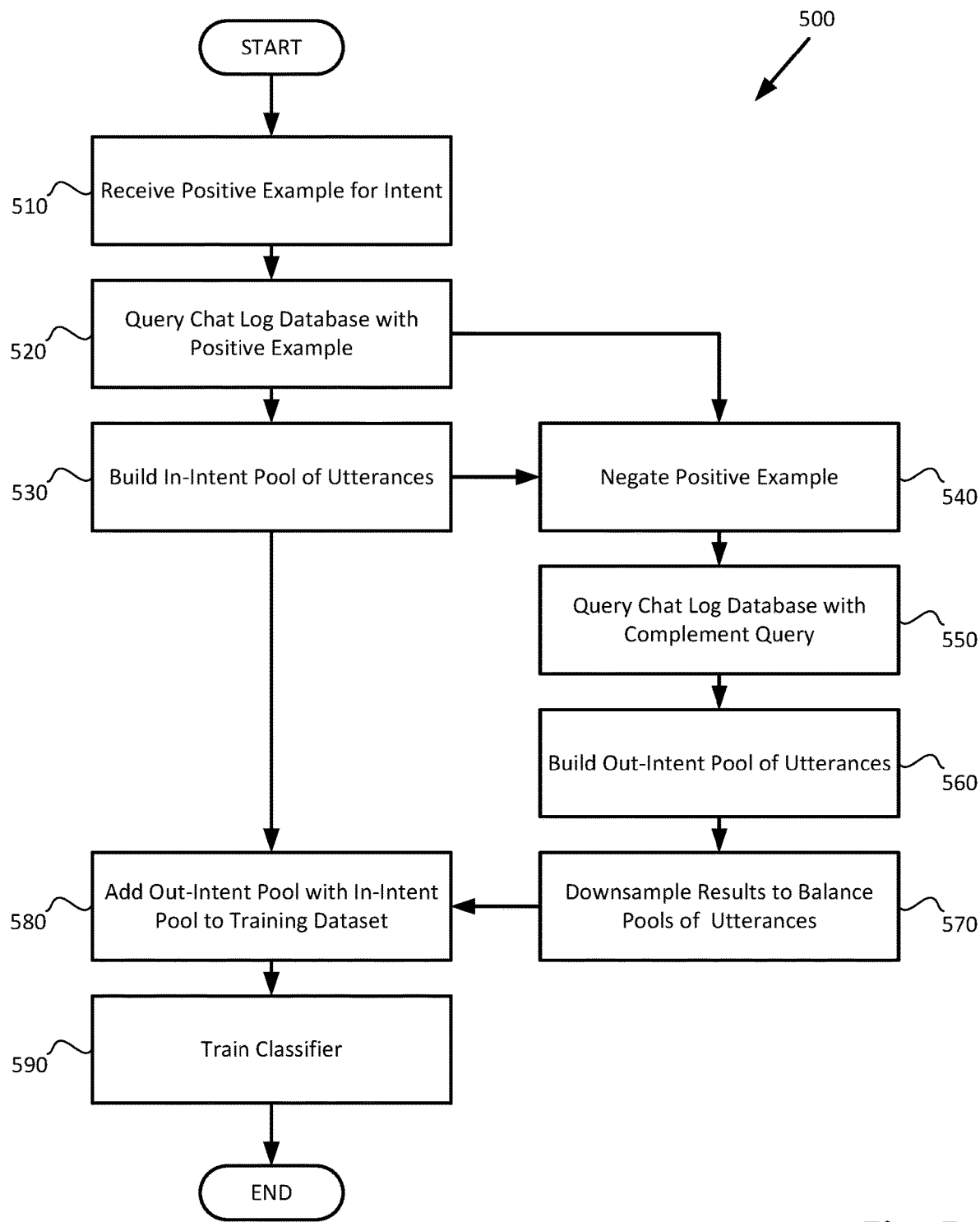
FIG. 5 is a flowchart of a method for class balancing for intent authoring via search, according to embodiments of the present disclosure.

FIG. 4 illustrates a flow for building a dataset 460 for intent authoring, which may be understood in conjunction with the method 500 illustrated in FIG. 5. A developer submits, via a node 54, one or more positive examples 410 of an utterance that should be associated with a particular intent by a classifier 363 (Block 510). The developer may provide several positive examples 410, each of which may be labeled to indicate one of several potential intents that the particular positive example 410 is associated with.

The dataset builder 365 receives the positive example 410, and queries the chat log database 371 via a search engine to identify utterances from historic conversations that are similar to the positive example 410 (Block 520). In various embodiments, the dataset builder 365 builds a search query using the positive example 410 as a basis that removes superfluous words from the positive example 410, leaving only key terms to be searched. For example, a query of "How do I reset my password" may be simplified to the key terms of 'reset' and 'password' when searching the chat log database 371. In various embodiments, the developer specifies the positive example 410 in a search format rather than a natural language format. For example, the developer may submit the positive example 410 as "reset AND password" to indicate that the dataset builder 365 is to search the chat log database 371 for utterances including both the word 'reset' and the word 'password'.

The dataset builder 365 receives a plurality of results from the chat log database 371 that are responsive to the query based on the positive example 410, and builds an in-intent pool 430 for use in a training dataset from those results (Block 530). The in-intent pool 430 includes several utterances, specified by the developer or retrieved as results from the chat log database 371 that match the intent associated with the positive example 410. In various embodiments, the dataset builder 365 presents some or all of the results to the developer to approve of which results to include in the in-intent pool 430, while in other embodiments the dataset builder 365 automatically selects which results to include. In some embodiments, the developer may specify the in-intent pool 430 to include at least a first number of utterances and no more than a second number of utterances, and the dataset builder 365 prunes the result set to provide a number of utterances between the first and second numbers to make up the in-intent pool 430. In various embodiments, the dataset builder 365 randomly selects which utterances from the result set to include/exclude, while in other embodiments the dataset builder 365 may rank the results to provide the top N results, the N most unique results, N results gathered evenly over a time window, etc. to make up the in-intent pool 430.

The dataset builder 365 negates the positive example 410 to form a complement query 420 (Block 540). In some embodiments, the dataset builder 365 negates not only the positive example 410 received from the developer, but also the contents of the in-intent pool 430 to create additional complement queries 420. When forming the complement query(ies) 420, the dataset builder 365 may remove superfluous words from the positive example(s) 410, leaving only key terms to be searched. For example, an utterance of "How do I reset my password" may be simplified to the key terms of 'reset' and 'password' when searching the chat log database 371. In one embodiment, the dataset builder 365 applies a Boolean NOT operator to each key term from a positive example 410 to form the complement query 420. For example, the key terms of 'reset' and 'password' may be presented as 'NOT(reset)' and 'NOT(password)'. In one embodiment, the dataset builder 365 joins each key term via a Boolean OR operator and negates the joined terms via one Boolean NOT operator. For example, the key terms of 'reset' and 'password' may be joined as 'reset OR password' and negated as 'NOT(reset OR password)'. The dataset builder 365 then queries the chat log database 371 via a search engine to identify utterances from historic conversations that are similar to the complement query(ies) 420 (Block 550).

The dataset builder 365 receives a plurality of results from the chat log database 371 that are responsive to the complement query(ies) 420, and builds an out-intent pool 440 for use in a training dataset from those results (Block 560). The out-intent pool 440 includes several utterances retrieved as results from the chat log database 371 that do not match the intent associated with the positive example 410 (i.e., that are negative/complement examples). The dataset builder 365 may select which complement utterances to include in the out-intent pool 440 from the candidate utterances in the results based on a ranking or merger (e.g., an intersection or a vote) that scores the highest hits for the search terms among the results. To ensure that instances of utterances in the in-intent pool 430 and the out-intent pool do not intersect, the dataset builder 365 may remove any instances of an utterance from the out-intent pool 440 that are also found in the in-intent pool 430 or remove any instances of an utterance from the in-intent pool 430 that are also found in the out-intent pool 440 for a particular intent.

A balancer module 450 of the dataset builder 365 balances a number of utterances in the in-intent pool 430 and the out-intent pool 440 to match a defined ratio for the training dataset 460 or a defined number X entries in the in-intent pool 430 and a defined number Y entries in the out-intent pool 440 (Block 570). For example, with an x:y ratio specified, the balancer module 450 down samples the larger of the in-intent pool 430 and the out-intent pool 440 by removing utterances from the larger pool to leave x utterances in the in-intent pool 430 and for every y references in the out-intent pool 440. The balancer module 450 respects sizing constraints for the size of the in-intent pool 430 and the out-intent pool 440 when balancing the pools, and seeks to maximize the size of the pools within the specified ratio and size constraints for the pools. For example, given the option of providing a training dataset 460 (according to the ratio of x:y) with X in-intent utterances and Y out-intent utterances or 2X in-intent utterances and 2Y out-intent utterances, the balancer module 450 provides the pools with 2X in-intent utterances and 2Y out-intent utterances.

In embodiments where the out-intent pool 440 is the larger pool, the balancer module 450 may randomly select which utterances to include/exclude to meet the size requirement or may determine the Y entries that appear in the lowest number of in-intent pools 430 for other intents to include in the out-intent pool 440. For example, where a developer specifies five intents, five in-intent pools 430 are created (one for each intent) and five out-intent pools 440 are created (one for each intent). The balancer module 450 may select which utterances in each of the out-intent pools 440 based on which utterances appear in the fewest in-intent pools 430 or are least similar to sentences in other in-intent pools; prioritizing out-intent utterances that do not relate to any of the intents over out-intent utterances that do not relate to some but not all of the intents.

The dataset builder 365 adds the out-intent pool 440 as a counter class to the dataset 460 and adds the in-intent pool 430 as a positive class to the dataset 460 (Block 580). The dataset builder 365 may continue building the dataset 460 so that each intent includes at least a predefined number of positive and negative/complement examples of utterances that a classifier 363 may be trained by. The dataset builder 365 provides the dataset 460 to the trainer 364 when complete, and based on a developer request, the trainer 364 trains (or retrains) the classifier 363 using the dataset 460 with a set of positive and negative/complement examples extracted from historic conversations (Block 590).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
receiving a positive example of an utterance associated with an intent;
building an in-intent pool of utterances from a conversation log using the positive example in a first search query of the conversation log;
adding the in-intent pool of utterances as a positive class to a training dataset;
applying Boolean operators to negate the positive example to form a complement example;
building an out-intent pool of utterances from the conversation log using the complement example in a first search query of the conversation log; and
adding the out-intent pool of utterances as a complement class to the training dataset.

2. The method of claim 1, further comprising:
downsampling a larger of the in-intent pool and the out-intent pool to balance a number utterances between the in-intent pool and the out-intent pool.

3. The method of claim 1, wherein negating the positive example further comprises:
extracting key terms from the positive example; and
applying a Boolean NOT operator to each of the key terms; and
wherein building the out-intent pool of utterances further comprises:
selecting complement utterances for inclusion in the out-intent pool from candidate utterances returned as results to the first search query based on a ranking of hits to the first search query for in the candidate utterances.

4. The method of claim 1, wherein negating the positive example further comprises:
extracting key terms from the positive example;
joining the key terms via Boolean OR operators; and
applying one Boolean NOT operator to the joined key terms.

5. The method of claim 1, wherein the out-intent pool of the training dataset contains no intersecting utterances with the in-intent pool, further comprising, prior to finalizing the training dataset, for each utterance in the out-intent pool:
in response to determining that an instance of a given utterance is included in the in-intent pool and the out-intent pool, removing the instance of the given utterance from the out-intent pool.

6. The method of claim 5, further comprising:
wherein utterances comprising the out-intent pool of utterances as complement examples for a first intent are included as candidate positive examples for use in an in-intent pool for a second intent different from the first intent.

7. The method of claim 1, further comprising:
training a classifier for a Natural Language Processing model via the training dataset.

8. A computer-readable storage medium including instructions that when executed by a processor enable the processor to perform an operation, the operation comprising:
receiving a positive example of an utterance associated with an intent;
building an in-intent pool of utterances from a conversation log using the positive example in a first search query of the conversation log;
adding the in-intent pool of utterances as a positive class to a training dataset;
applying Boolean operators to negate the positive example to form a complement example;
building an out-intent pool of utterances from the conversation log using the complement example in a first search query of the conversation log; and
adding the out-intent pool of utterances as a complement class to the training dataset.

9. The computer-readable storage medium of claim 8, further comprising:
downsampling a larger of the in-intent pool and the out-intent pool to balance a number utterances between the in-intent pool and the out-intent pool.

10. The computer-readable storage medium of claim 8, wherein negating the positive example further comprises:
extracting key terms from the positive example; and
applying a Boolean NOT operator to each of the key terms; and
wherein building the out-intent pool of utterances further comprises:
selecting complement utterances for inclusion in the out-intent pool from candidate utterances returned as results to the first search query based on a ranking of hits to the first search query for in the candidate utterances.

11. The computer-readable storage medium of claim 8, wherein negating the positive example further comprises:
extracting key terms from the positive example;
joining the key terms via Boolean OR operators; and
applying one Boolean NOT operator to the joined key terms.

12. The computer-readable storage medium of claim 8, wherein the out-intent pool of the training dataset contains no intersecting utterances with the in-intent pool, further comprising, prior to finalizing the training dataset, for each utterance in the out-intent pool:
in response to determining that an instance of a given utterance is included in the in-intent pool and the out-intent pool, removing the instance of the given utterance from the out-intent pool.

13. The computer-readable storage medium of claim 12, further comprising:
wherein utterances comprising the out-intent pool of utterances as complement examples for a first intent are included as candidate positive examples for use in an in-intent pool for a second intent different from the first intent.

14. The computer-readable storage medium of claim 8, further comprising:
training a classifier for a Natural Language Processing model via the training dataset.

15. A system, comprising:
a processor; and
a memory storage device including instructions that when executed by the processor, enable the processor to:
receive a positive example of an utterance associated with an intent;
build an in-intent pool of utterances from a conversation log using the positive example in a first search query of the conversation log;
add the in-intent pool of utterances as a positive class to a training dataset;
apply Boolean operators to negate the positive example to form a complement example;
build an out-intent pool of utterances from the conversation log using the complement example in a first search query of the conversation log; and
add the out-intent pool of utterances as a complement class to the training dataset.

16. The system of claim 15, wherein the instructions, when executed by the processor, further enable the processor to:
downsample a larger of the in-intent pool and the out-intent pool to balance a number utterances between the in-intent pool and the out-intent pool.

17. The system of claim 15, wherein to negate the positive example, the processor:
extracts key terms from the positive example; and
applies a Boolean NOT operator to each of the key terms; and
wherein to build the out-intent pool of utterances, the processors:
selects complement utterances for inclusion in the out-intent pool from candidate utterances returned as results to the first search query based on a ranking of hits to the first search query for in the candidate utterances.

18. The system of claim 15, wherein to negate the positive example, the processor:
extracts key terms from the positive example;
joins the key terms via Boolean OR operators; and
applies one Boolean NOT operator to the joined key terms.

19. The system of claim 15, wherein the out-intent pool of the training dataset contains no intersecting utterances with the in-intent pool, further comprising, prior to finalizing the training dataset, for each utterance in the out-intent pool:
in response to determining that an instance of a given utterance is included in the in-intent pool and the out-intent pool, removing the instance of the given utterance from the out-intent pool.

20. The system of claim 15, wherein the instructions, when executed by the processor, further enable the processor to:
train a classifier for a Natural Language Processing model via the training dataset.

* * * * *